United States Patent [19]

Shindo et al.

[11] Patent Number: 5,041,341
[45] Date of Patent: Aug. 20, 1991

[54] INFORMATION RECORDING MEDIA

[75] Inventors: Kiyotaka Shindo; Koichi Igarashi; Kunihiko Mizumoto; Hidehiko Hashimoto, all of Ichihara, Japan

[73] Assignee: Mitsui Petrochemical Industries, Ltd., Tokyo, Japan

[21] Appl. No.: 527,364

[22] Filed: May 23, 1990

[30] Foreign Application Priority Data

May 23, 1989 [JP] Japan ................................ 1-129552
May 23, 1989 [JP] Japan ................................ 1-129555
Jun. 20, 1989 [JP] Japan ................................ 1-157532

[51] Int. Cl.$^5$ .......................... G11B 7/24; G11B 5/62; G11B 9/00
[52] U.S. Cl. ..................................... 428/626; 428/631; 428/650; 428/651; 428/652; 428/653
[58] Field of Search ............... 428/626, 631, 650, 651, 428/652, 653

[56] References Cited

U.S. PATENT DOCUMENTS

| | | | |
|---|---|---|---|
| 4,615,944 | 10/1986 | Gardner | 428/650 |
| 4,690,861 | 9/1987 | Nakamura et al. | 428/651 |
| 4,740,430 | 4/1988 | Frankenthal et al. | 428/651 |
| 4,975,336 | 12/1990 | Wang et al. | 428/626 |

Primary Examiner—R. Dean
Assistant Examiner—David Schumaker
Attorney, Agent, or Firm—Sherman and Shalloway

[57] ABSTRACT

In accordance with the present invention, there are provided information recording media having a substrate and thereon a recording layer and a metallic layer, wherein the metallic layer is composed of an aluminum alloy containing (i) titanium and (ii) at least one metal selected from among chromium, niobium and magnesium. The information recording media thus provided are excellent in corrosion resistance and small in dependence of the recording power on linear velocity.

6 Claims, 1 Drawing Sheet

INFORMATION RECORDING MEDIA

FIELD OF THE INVENTION

This invention relates to information recording media having a metallic layer and more particularly to information recording media excellent in corrosion resistance or stability, and small in dependence of their recording power on linear velocity.

BACKGROUND OF THE INVENTION

In information recording media such as magnetooptical recording discs having a substrate and thereon a recording layer and a metallic layer and capable of rewriting information, it is to be desired that the dependence of the recording power on linear velocity is made small so that the recording power for reproducing information used in said media does not largely vary with the inner peripheral and outer peripheral portions of the medium.

Usually, in the information recording medium such as the magnetooptical recording disc, a metallic layer is formed, in addition to the magnetooptical recording layer, on a substrate. The metallic layers which have been used so far in the information recording media of the type such as magnetooptical recording discs are composed of nickel alloys, aluminum metal or aluminum alloys containing 0.1–10% by weight of titanium. However, the metallic layers composed of aluminum metal or aluminum-titanium alloys had such disadvantages that they are poor in corrosion resistance and cannot withstand a long-term service.

The metallic layers composed of nickel alloys had also such a serious disadvantage that the recording power required at the time of writing information in the disc largely varies with the inner peripheral and outer peripheral portions of said disc, with the result that the dependence of the recording power on linear velocity is still large.

With the view of developing information recording media which are excellent in corrosion resistance or stability and which are small in dependence of the recording power on linear velocity, the present inventors prosecuted extensive researches to find that the information recording media having a metallic layer composed of an aluminum alloy containing (i) titanium and (ii) at least one metal selected from (ii) chromium, niobium and magnesium are excellent in corrosion resistance and small in dependence of the recording power on linear velocity. Thus, the present inventors have accomplished the present invention.

OBJECT OF THE INVENTION

The present invention is intended to solve such problems associated with the prior art as mentioned above, and an object of the invention is to provide information recording media which are excellent in corrosion resistance and small in dependence of the recording power on linear velocity.

SUMMARY OF THE INVENTION

The first information recording medium of the present invention having a substrate and thereon a recording layer and a metallic layer is characterized in that the metallic layer is composed of an aluminum alloy containing 0.1–9.5 atom % of titanium and 0.1–5 atom % of chromium based on all atoms constituting alumium alloy layer, the combined content of said titanium and chromium being not more than 10 atom %.

The second information recording medium of the invention having a substrate and thereon a recording layer and a metallic layer is characterized in that the metallic layer is composed of an aluminum alloy containing 0.5–5 atom % of titanium and 0.5–5 atom % of niobium based on all atoms constituting alumium alloy layer, the combined content of said titanium and niobium being 1–5.5 atom %.

The third information recording medium of the invention having a substrate and thereon a recording layer and a metallic layer is characterized in that the metallic layer is composed of an aluminum alloy containing 0.1–10 atom % of titanium and 0.1–10 atom % of magnesium based on all atoms constituting alumium alloy layer, the combined content of said titanium and magnesium being not more than 15 atom %.

The fourth information recording medium of the invention having a substrate and thereon a recording layer and a metallic layer is characterized in that the metallic layer is composed of an aluminum alloy containing 0.1–10 atom % of titanium, 0.1–10 atom % of magnesium and not more than 10 atom % of chromium based on all atoms constituting alumium alloy layer, the combined content of said titanium, magnesium and chromium being not more than 15 atom %.

This information recording media of the present invention as illustrated above, which individually have a metallic layer composed of an aluminum alloy containing (i) titanium and (ii) at least one metal selected from among chromium, niobium and magnesium, are excellent in corrosion resistance, small in dependence of the recording power on linear velocity and also excellent in performance of protecting the recording layer.

1 . . . Information recording medium
2 . . . Substrate
3 . . . Recording layer
4 . . . Metallic layer
5 . . . Protective film

DETAILED DESCRIPTION OF THE INVENTION

The information recording media of the present invention are illustrated below in detail.

Figure 1:
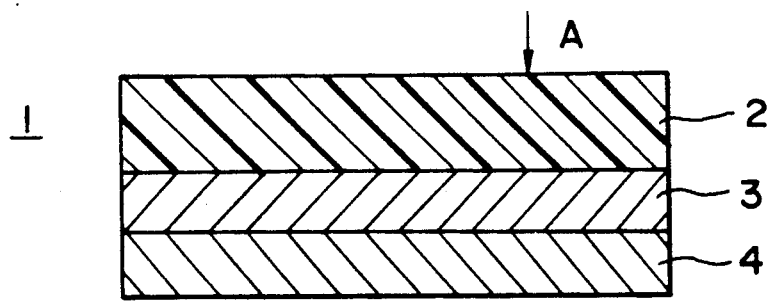
FIG. 1 is a rough sketch of one embodiment of the information recording medium in cross section of the present invention.
Figure 2:
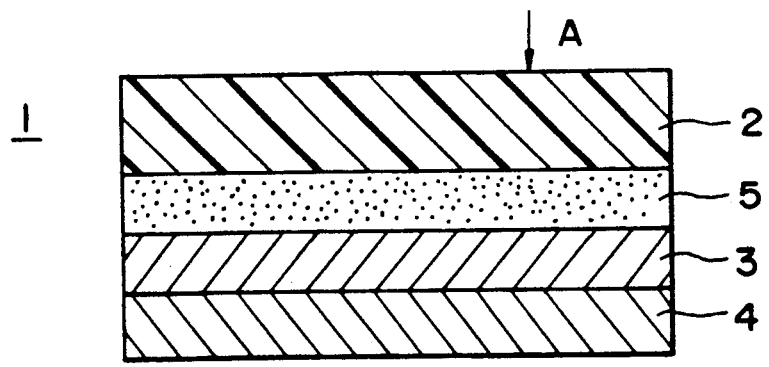
FIG. 2 is a rough sketch of another embodiment of the information recording medium in cross section of the present invention.

FIG. 1 is a rough sketch of the information recording medium in cross section of one embodiment of the invention, and FIG. 2 is also a rough sketch of the information recording medium in cross section of another embodiment of the invention.

In the information recording media of the invention, the information stored in said recording media is read out by means of light such as laser beam. Information recording media of this type include, in concrete, postscript type optical disc capable of additional recording but incapable of erasing information recorded, magnetooptical recording discs capable of recording information as well as of erasing and reproducing information recorded, and rewriting type optical discs such as phase change discs.

As can be seen from FIG. 1, for example, in an information recording medium 1 of the invention, a recording layer 3 and a metallic layer 4 are formed on a substrate 2 in that order.

Materials for the above-mentioned substrate 2 used in the invention are not particularly limited to specific ones. However, when laser beam is incident upon the substrate 2 (from the direction of an arrow A), the materials used therefor are preferably those which are transparent. Besides inorganic materials such as glass, aluminum and the like, such transparent materials include, for example, organic materials such as poly(methyl methacrylate), polycarbonate, polymer alloys of polycarbonate with polystyrene, such cycloolefin random copolymers as disclosed in U.S. Pat. No. 4,614,778, such cycloolefin random copolymers (A) as mentioned below, poly-4-methyl-1-pentene, epoxy resins, polyether sulfone, polysulfone, polyether imide and the like. Of these organic materials, preferred are poly(methyl methacrylate), polycarbonate, such cycloolefin random copolymers as disclosed in U.S. Pat. No. 4,614,778 and the cycloolefin random copolymers (A) as mentioned below.

From the standpoint of good adhesion particularly to the recording layer and a small double refractive index, particularly desirable materials for the substrate used in the present invention are cycloolefin random copolymers (A) of ethylene and a cycloolefin represented by the following general formula [I], [I-a] or [I-b].

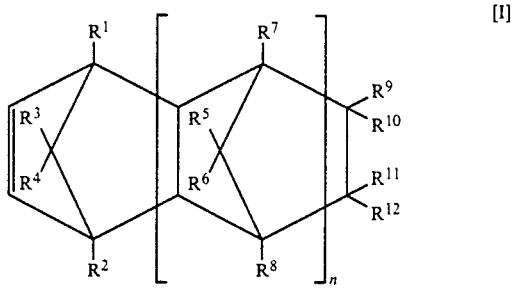

wherein n is 0 or a positive integer, $R^1$ to $R^{12}$ are the same or different, and each represents a hydrogen atom, a halogen atom or a hydrocarbon group and $R^9$ to $R^{12}$, when taken together, may form a mono- or poly-cyclic hydrocarbon ring which may optionally have double bond or bonds, or $R^9$ and $R^{10}$ or $R^{11}$ and $R^{12}$, when taken together, may form an alkylidene group.

Further explanation of the cycloolefin represented by the general formula [I] will be given below. The cycloolefin represented by the general formula [I] may also be represented by the following general formula [I-a].

General formula

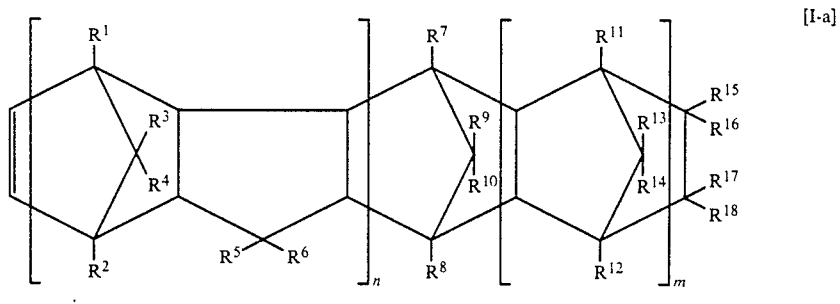

In the general formula [I-a], n is 0 or 1, m is 0 or positive integer, $R^1$ to $R^{18}$ represent each a atom or a group selected from the group of a hydrogen atom, a halogen atom and a hydrocarbon group.

$R^{15}$ to $R^{18}$, when taken together, may form a mono- or poly-cyclic hydrocarbon ring which may optionally have double bond or bonds.

Further more, $R^{15}$ and $R^{16}$, or $R^{17}$ and $R^{18}$, when taken together, may form an alkylidene group.

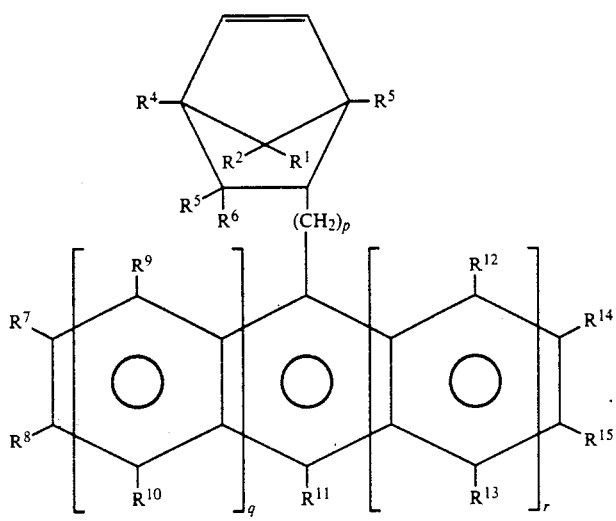

wherein p is an integer of at least 0, q and r are each 0,1 or 2, $R^1$ to $R^{15}$ represent each an atom or a group selected from the group of a hydrogen atom, a halogen atom, an aliphatic hydrocarbon group, an aromatic hydrocarbon group and an alkoxy group, and $R^5$ (or $R^6$) and $R^8$ (or $R^7$) may be bonded together directly without an intermediate group or through an alkylene group of one to three carbon atoms.

The concrete example of the cycloolefins represented by the general formula [I] includes 1,4,5,8-dimethano-1,2,3,4,4a,5,8,8a-octahydronaphthalenes, such octahydronaphthalenes as 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2-propyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-methyl-3-ethyl-1,4,5,8-dimethano-1,2,3,4,4a,5,8,,8a-octahydronaphthalene, 2-chloro-1,4,5,8-dimethano-1,2,3,4,4a,5,8,8a-octahydronaphthalene, 2-bromo-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, 2,3-dichloro-1,4,5,8-dimethano-1,2,3,4,4a,5,8,8a-octahydronaphthalene, 2-cyclohexyl-1,4,5,8-dimethano-1,2,3,4,4a,5,8,8a-octahydronaphthalene, 2-n-butyl-1,4,5,8-dimethano-1,2,3,4,4a,5,8,8a-octahydronaphthalene, 2-isobutyl-1,4,5,8-dimethano-1,2,3,4,4a,5,8,8a-octahydronaphthalene, etc.

Furthermore, the cycloolefin represented by the general formula [I] includes, bicyclo[2,2,1]hepto-2-en derivatives, tetracyclo[4,4,0,$1^{2.5}$,$1^{7.10}$]-3-dodecene derivatives, hexacyclo[6,6,1,$1^{3.6}$,$1^{10.13}$,$0^{2.7}$,$0^{9.14}$]-4-heptadecene, derivatives, octacyclo[8,8,0,$1^{2.9}$,$1^{4.7}$,$1^{11.18}$,$1^{13.16}$,$0^{3.8}$,$0^{12.17}$]-5-docosene derivatives, pentacyclo[8,8,0,$1^{2.9}$,$1^{4.7}$,$1^{11.18}$,$1^{13.16}$,$0^{3.8}$,$0^{12.17}$]-5-docosene derivatives, pentacyclo[6,6,1,$1^{3.6}$,$0^{2.7}$,$0^{9.14}$]-4-hexadecene derivatives, heptacyclo-5-icosene derivatives, heptacyclo-5-henicosene derivatives, toricyclo[4,3,0,$1^{2.5}$]-3-decene derivatives toricyclo[4,3,0,$1^{2.5}$]-3-undecene derivatives, pentacyclo[6,5,1,$1^{3.6}$,$0^{2.7}$,$0^{9.13}$]-4-pentadecene derivatives, pentacyclopentadecadiene derivatives, pentacyclo[4,7,0,$1^{2.5}$,$0^{8.13}$,$1^{9.12}$]-3-pentadecene derivatives, pentacyclo[7,8,0,$1^{3.6}$,$0^{2.7}$,$1^{10.17}$,$0^{11.16}$,$1^{12.15}$]-4-icosene derivatives, and nonacyclo[9,10,1,1,4.7,$0^{3.8}$,$0^{2.10}$,$0^{12.21}$,$1^{13.20}$,$0^{14.19}$,$1^{15.18}$]-5-pentacosene derivatives.

The concrete examples of such compounds as mentioned above are illustrated hereunder.

Bicyclo [2,2,1]hept-2-ene derivatives such as:

| | |
|---|---|
| 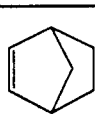 | Bicyclo[2,2,1]hept-2-ene |
| 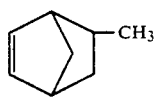 | 6-Methylbicyclo[2,2,1]hept-2-ene |
| 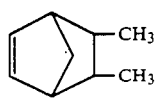 | 5,6-Dimethylbicyclo[2,2,1]hept-2-ene |
| 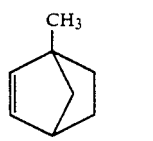 | 1-Methylbicyclo[2,2,1]hept-2-ene |
| 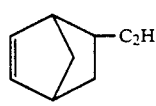 | 6-Ethylbicyclo[2,2,1]hept-2-ene |
| 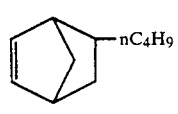 | 6-n-Butylbicyclo[2.2,1]hept-2-ene |
| 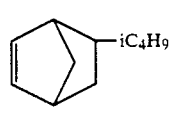 | 6-Isobutylbicyclo[2,2,1]hept-2-ene |

-continued

 7-Methylbicyclo[2,2,1]hept-2-ene:

Tetracyclo[4,4,0,1$^{2.5}$,1$^{7.10}$]-3-dodecene derivatives such as:

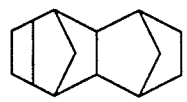 Tetracyclo[4,4,0,1$^{2.5}$,1$^{7.10}$]-3-dodecene

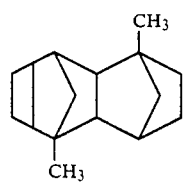 5,10-Dimethyltetracyclo[4,4,0,1$^{2.5}$,1$^{7.10}$]-3-dodecene

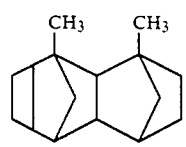 2,10-Dimethyltetracyclo-[4,4,0,1$^{2.5}$,1$^{7.10}$]-3-dodecene

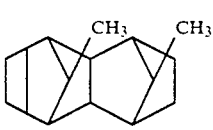 11,12-Dimethyltetracyclo-[4,4,0,1$^{2.5}$,1$^{7.10}$]-3-dodecene

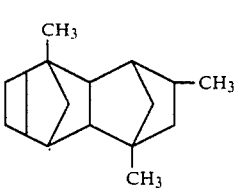 2,7,9-Trimethyltetracyclo-[4,4,0,1$^{2.5}$,1$^{7.10}$]-3-dodecene

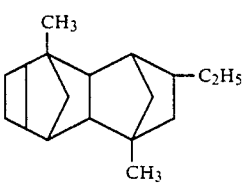 9-Ethyl-2,7-dimethyl-tetracyclo-[4,4,0,1$^{2.5}$,1$^{7.10}$]-3-dodecene

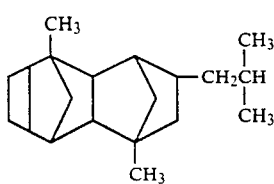 9-Isobutyl-2,7-dimethyl-tetracyclo-[4,4,0,1$^{2.5}$,1$^{7.10}$]-3-dodecene

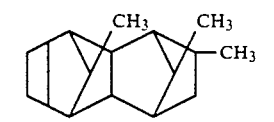 9,11,12-Trimethyltetracyclo-[4,4,0,1$^{2.5}$,1$^{7.10}$]-3-dodecene

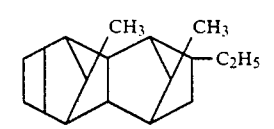 9-Ethyl-11,12-dimethyl-tetracyclo-[4,4,0,1$^{2.5}$,1$^{7.10}$]-3-dodecene

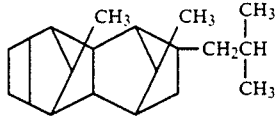 9-Isobutyl-11,12-dimethyl-tetracyclo-[4,4,0,1$^{2.5}$,1$^{7.10}$]-3-dodecene

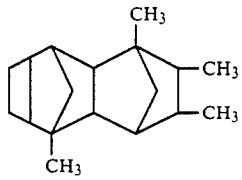 5,8,9,10-Tetramethyl-tetracyclo-[4,4,0,1$^{2.5}$,1$^{7.10}$]-3-dodecene

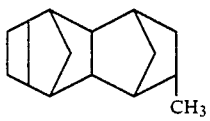 8-Methyltetracyclo[4,4,0,1$^{2.5}$,1$^{7.10}$]-3-dodecene

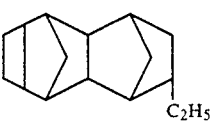 8-Ethyltetracyclo[4,4,0,1$^{2.5}$,1$^{7.10}$]-3-dodecene

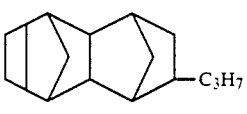 8-Propyltetracyclo[4,4,0,1$^{2.5}$,1$^{7.10}$]-3-dodecene

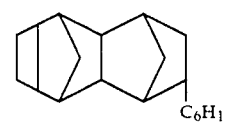 8-Hexyltetracyclo[4,4,0,1$^{2.5}$,1$^{7.10}$]-3-dodecene

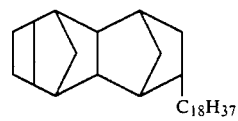 8-Stearyltetracyclo[4,4,0,1$^{2.5}$,1$^{7.10}$]-3-dodecene

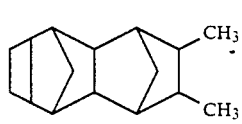 8,9-Dimethyltetracyclo[4,4,0,1$^{2.5}$,1$^{7.10}$]-3-dodecene

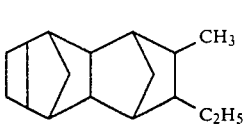 8-Methyl-9-ethyltetracyclo[4,4,0,1$^{2.5}$,1$^{7.10}$]-3-dodecene

 8-Chlorotetracyclo[4,4,0,1$^{2.5}$,1$^{7.10}$]-3-dodecene

 8-Bromotetracyclo[4,4,0,1$^{2.5}$,1$^{7.10}$]-3-dodecene

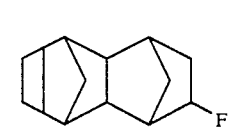 8-Fluorotetracyclo[4,4,0,1$^{2.5}$,1$^{7.10}$]-3-dodecene

| | |
|---|---|
|  | 8,9-Dichlorotetracyclo[4,4,0,1$^{2.5}$,1$^{7.10}$]-3-dodecene |
|  | 8-Cyclohexyltetracyclo[4,4,0,1$^{2.5}$,1$^{7.10}$]-3-dodecene |
| 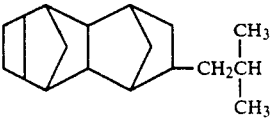 | 8-Isobutyltetracyclo[4,4,0,1$^{2.5}$,1$^{7.10}$]-3-dodecene |
| 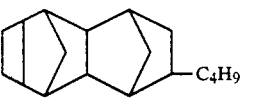 | 8-Butyltetracyclo[4,4,0,1$^{2.5}$,1$^{7.10}$]-3-dodecene |
| 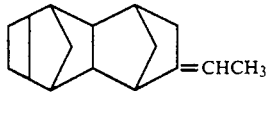 | 8-Ethylidenetetracyclo[4,4,0,1$^{2.5}$,1$^{7.10}$]-3-dodecene |
| 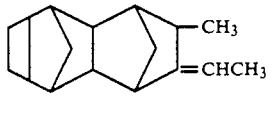 | 8-Ethylidene-9-methyl-tetracyclo[4,4,0,1$^{2.5}$,1$^{7.10}$]-3-dodecene |
| 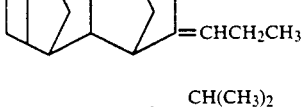 | 8-n-Propylidene-9-ethyl-tetracyclo[4,4,0,1$^{2.5}$,1$^{7.10}$]-3-dodecene |
| 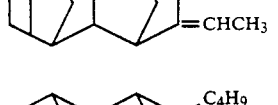 | 8-Ethylidene-9-isopropyltetracyclo[4,4,0,1$^{2.5}$,1$^{7.10}$]-3-dodecene |
| 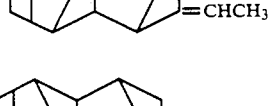 | 8-Ethylidene-9-butyl-tetracyclo[4,4,0,1$^{2.5}$,1$^{7.10}$]-3-dodecene |
| 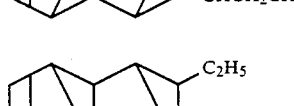 | 8-n-Propylidenetetracyclo[4,4,0,1$^{2.5}$,1$^{7.10}$]-3-dodecene |
| 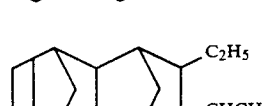 | 8-n-Propylidene-9-ethyltetracyclo[4,4,0,1$^{2.5}$,1$^{7.10}$]-3-dodecene |
| 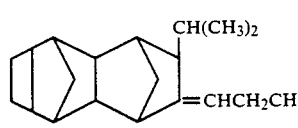 | 8-Ethylidene-9-ethyl-tetracyclo[4,4,0,1$^{2.5}$,1$^{7.10}$]-3-dodecene |
| 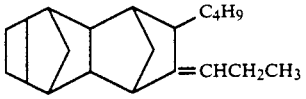 | 8-n-Propylidene-9-isopropyltetracyclo[4,4,0,1$^{2.5}$,1$^{7.10}$]-3-dodecene |
| 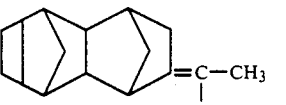 | 8-n-Propylidene-9-butyltetracyclo[4.4.0,1$^{2.5}$,1$^{7.10}$]-3-dodecene |
| 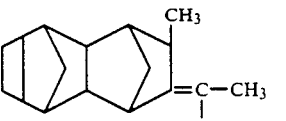 | 8-Isopropylidenetetracyclo[4,4,0,1$^{2.5}$,1$^{7.10}$]-3-dodecene |
| 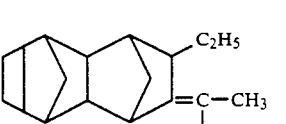 | 8-Isopropylidene-9-methyltetracyclo[4,4,0,1$^{2.5}$,1$^{7.10}$]-3-dodecene |
| 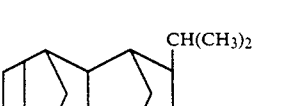 | 8-Isopropylidene-9-ethyltetracyclo[4,4,0,1$^{2.5}$,1$^{7.10}$]-3-dodecene |
| 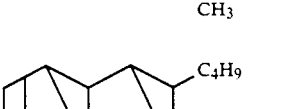 | 8-Isopropylidene-9-isopropyltetracyclo[4,4,0,1$^{2.5}$,1$^{7.10}$]-3-dodecene |
| 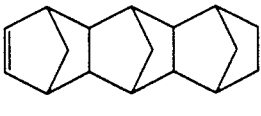 | 8-Isopropylidene-9-butyltetracyclo[4,4,0,1$^{2.5}$,1$^{7.10}$]-3-dodecene |

Hexacyclo[6,6,1,1$^{3.6}$,1$^{10.13}$,0$^{2.7}$,0$^{9.14}$]-4-heptadecene derivates such as:

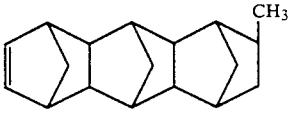

Hexacyclo[6,6,1,1$^{3.6}$,1$^{10.13}$,0$^{2.7}$,0$^{9.14}$]-4-heptadecene

12-Methylhexacyclo[6,6,1,1$^{3.6}$,1$^{10.13}$,0$^{2.7}$,0$^{9.14}$]-4-heptadecene

12-Ethylhexacyclo[6,6,1,1$^{3.6}$,1$^{10.13}$,0$^{2.7}$,0$^{9.14}$]-4-heptadecene -continued

12-Isobutylhexacyclo[6,6,1,1$^{3,6}$, 1$^{10,13}$,0$^{2,7}$,0$^{9,14}$]-4-heptadecene

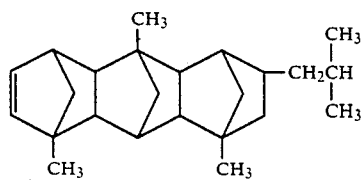

1,6,10-Trimethyl-12-isobutyl-hexacyclo[6,6,1,1$^{3,6}$,1$^{10,13}$,0$^{2,7}$,0$^{9,14}$]-4-heptadecene Octacyclo[8,8,0,1$^{2,9}$,1$^{4,7}$,1,1$^{11,18}$,1$^{13,16}$,0$^{3,8}$,0$^{12,17}$]-5-docosen derivates such as:

Octacyclo[8,8,0,1$^{2,9}$,1$^{4,7}$,1,1$^{11,18}$, 1$^{13,16}$,0$^{3,8}$,0$^{12,17}$]-5-docosene

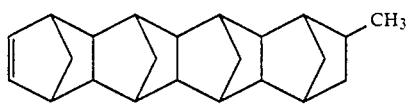

15-Methyloctacyclo[8,8,0,1$^{2,9}$,1$^{4,7}$,1,1$^{11,18}$, 1$^{13,16}$,0$^{3,8}$,0$^{12,17}$]-5-docosene

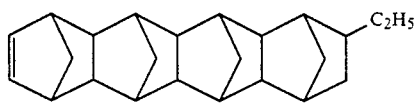

15-Ethyloctacyclo[8,8,0,1$^{2,9}$,1$^{4,7}$,1,1$^{11,18}$, 1$^{13,16}$,0$^{3,8}$,0$^{12,17}$]-5-docosene:

pentacyclo[6,6,1,1$^{3,6}$,0$^{2,7}$,0$^{9,14}$]-4-hexadecene derivates such as:

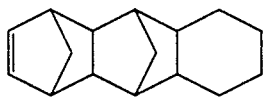

Pentacyclo[6,6,1,1$^{3,6}$,0$^{2,7}$,0$^{9,14}$]-4-hexadecene

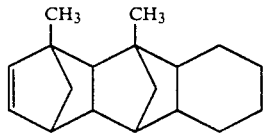

1,3-Dimethylpentacyclo[6,6,1, 1$^{3,6}$,0$^{2,7}$,0$^{9,14}$]-4-hexadecene

-continued

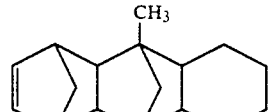

1,6-Dimethylpentacyclo[6,6,1, 1$^{3,6}$,0$^{2,7}$,0$^{9,14}$]-4-hexadecene

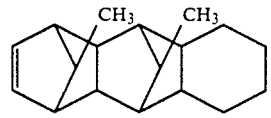

15,16-Dimethylpentacyclo[6,6,1, 1$^{3,6}$,0$^{2,7}$,0$^{9,14}$]-4-hexadecene heptacyclo-5-icosene derivates or heptacyclo-t-henicosene derivates such as:

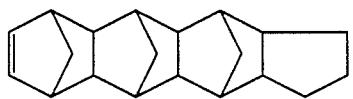

Heptacyclo[8,7,0,1$^{2,9}$,1$^{4,7}$,1$^{11,17}$, 0$^{3,8}$,0$^{12,16}$]-5-icosene

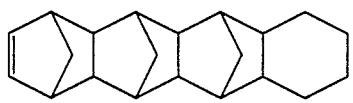

Heptacyclo[8,8,0,1$^{2,9}$,1$^{4,7}$,1$^{11,18}$, 0$^{3,8}$,0$^{12,17}$]-5-henicosene toricyclo[4,3,0,1$^{2,5}$]-3-decene derivatives such as:

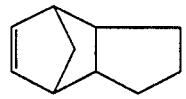

Tricyclo[4,3,0,1$^{2,5}$]-3-decene

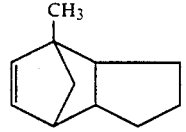

2-Methyl-tricyclo[4,3,0,1$^{2,5}$]-3-decene

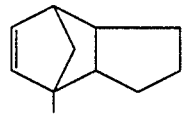

5-Methyl-tricyclo[4,3,0,1$^{2,5}$]-3-decene:

tricyclo[4,4,0,1$^{2,5}$]-3-undecene derivatives such as:

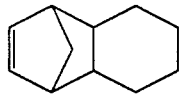

Tricyclo[4,4,0,1$^{2,5}$]-3-undecene

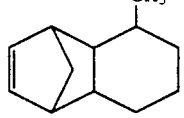

10-Methyl-tricyclo[4,4,0,1$^{2.5}$]-3-undecene:

pentacyclo[6,5,1,1$^{3.6}$,0$^{2.7}$,0$^{9.13}$]-4-pentadecene derivatives such as:

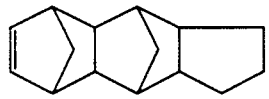

Pentacyclo[6,5,1,1$^{3.6}$, 0$^{2.7}$,0$^{9.13}$]-4-pentadecene

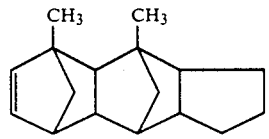

1,3-Dimethylpentacyclo[6,5,1,1$^{3.6}$, 0$^{2.7}$,0$^{9.13}$]-4-pentadecene

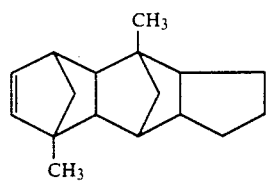

1,6-Dimethylpentacyclo[6,5,1,1$^{3.6}$, 0$^{2.7}$,0$^{9.13}$]-4-pentadecene

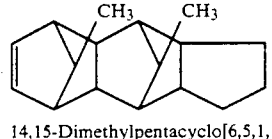

14,15-Dimethylpentacyclo[6,5,1,1$^{3.6}$, 0$^{2.7}$,0$^{9.13}$]-4-pentadecene:

diene compounds such as:

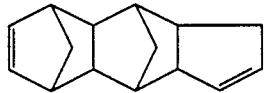

Pentacyclo[6,5,1,1$^{3.6}$, 0$^{2.7}$,0$^{9.13}$]-4,10-pentadecadiene:

Pentacyclo[7,4,0,1$^{2.5}$,0$^{8.13}$,1$^{9.12}$]-3pentadecene derivatives such as:

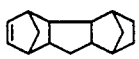

Pentacyclo[7,4,0,1$^{2.5}$,0$^{8.13}$,1$^{9.12}$]-3-pentadecene

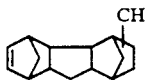

Methyl-substituted pentacyclo [7,4,0,1$^{2.5}$,0$^{8.13}$,1$^{9.12}$]-3-pentadecene heptacyclo[8,7,0,1$^{3.6}$,0$^{2.7}$,1$^{10.17}$,0$^{11.16}$,1$^{12.15}$]-4-icosene derivatives such as:

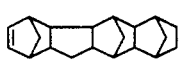

Heptacyclo[8,7,0,1$^{3.6}$,0$^{2.7}$,1$^{10.17}$, 0$^{11.16}$,1$^{12.15}$]-4-icosene

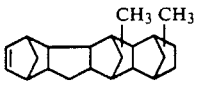

Dimethyl-substituted heptacyclo [8,7,0,1$^{3.6}$,0$^{2.7}$,1$^{10.17}$,0$^{11.16}$,1$^{12.15}$]-4-icosene nonacyclo[10,9,1,1$^{4.7}$,0$^{3.8}$,0$^{2.10}$,0$^{12.21}$,1$^{13.20}$,0$^{14.19}$,1$^{15.18}$]-5-pentacosene derivatives such as:

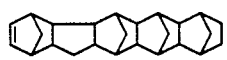

Nonacyclo[10,9,1,1$^{4.7}$,0$^{3.8}$,0$^{2.10}$,0$^{12.21}$, 1$^{13.20}$,0$^{14.19}$,1$^{15.18}$]-5-pentacosene

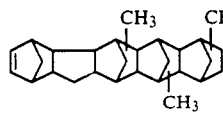

Trimethyl-substituted nonacyclo [10,9,1,1$^{4.7}$,0$^{3.8}$,0$^{2.10}$,0$^{12.21}$,1$^{13.20}$, 0$^{14.19}$,1$^{15.18}$]-5-pentacosene The following compounds can be mentioned as concrete examples of cycloolefins represented by the formula [I-b].

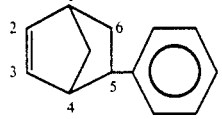

5-Phenylbicyclo[2,2,1]hept-2-ene

5-Methyl-5-phenylbicyclo[2,2,1]hept-2-ene

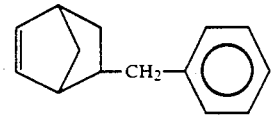

5-Benzylbicyclo[2,2,1]hept-2-ene

5-Tolybicyclo[2.2.1]hept-2-ene

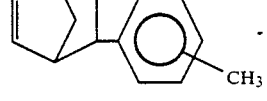

1,4-Methano-1,1a,4,4a-tetrahydrofluorene

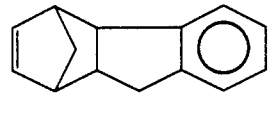

1,4-Methano-1,4,4a,5,10,10a-hexahydroanthracene

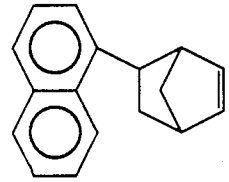

Cyclopentadiene-acenaphthylene addition products

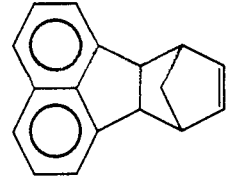

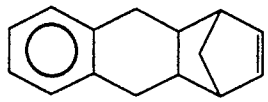 5-(α-naphthyl)bicyclo[2,2,1]hept-2-ene

The cycloolefin random copolymers (A) comprise ethylene units and the above-mentioned cycloolefin units as the essential components as aforesaid, however, if necessary, in addition to these two essential components, said copolymers may contain other copolymerizable unsaturated monomer components so long as they will not throw hinderances in the way of accomplishing the object of the present invention. The unsaturated monomers which may be copolymerized, if necessary, with the copolymers (A) may include, for example, alpha-olefins having from 3 to 20 carbon atoms such as propylene, 1-butene, 4-methyl-1-pentene, 1-hexene, 1-octene, 1-decene, 1-dodecene, 1-tetradecene, 1-hexadecene, 1-octadecene and 1-eicosene which may be used in an amount of up to an equimolar to the ethylene component unit in the resulting random copolymer.

In the cycloolefin random copolymer [A] having a softening point (TMA) of at least 70° C., the recurring units [a] derived from ethylene are present in an amount of from 40 to 85 mol %, preferably from 50 to 75 mol %, while the recurring units [b] derived from the cycloolefin are present in an amount of from 15 to 60 mol %, preferably from 25 to 50 mol %, and these recurring units [a] and [b] are arranged at random in the substantially linear chain of the copolymer [A]. The molar percentage of the recurring units [a] and [b] were determined by $^{13}C$-NMR. The fact that this cycloolefin random copolymer [A] is completely soluble in decalin at 135° C. confirms that it is substantially linear and free from a gel-forming crosslinked structure.

The cycloolefin random copolymer [A] has an intrinsic viscosity [η] of from 0.05 to 10 dl/g, preferably from 0.08 to 5 dl/g as measured in decalin at 135° C.

The softening temperature (TMA) of the cycloolefin random copolymer [A] as measured by a thermal mechanical analyzer is at least 70° C., preferably from 90° to 250° C., and further preferably from 100° to 200° C. The softening temperature (TMA) referred to above was determined by monitoring thermal deformation behavior of a 1 mm sheet of the copolymer [A] using a thermomechanical analyzer manufactured and sold by Du Pont. More specifically, a quartz needle was vertically placed on the sheet under a load of 49 g and the assembly was heated at a rate of 5° C./min, and a temperature at which the needle penetrated into the sheet by the depth of 0.635 mm was taken as TMA. This cycloolefin random copolymer [A] has a glass transition temperature (Tg) of normally from 50° to 230° C., preferably from 70° to 210° C.

The crystallinity of this cycloolefin random copolymer [A] as measured by X-ray diffractometry is normally from 0 to 10%, preferably from 0 to 7%, and further preferably from 0 to 5%.

The cycloolefin copolymers (A) constituting the cycloolefin random copolymer composition used in the present invention for forming the substrate may all be prepared by the processes proposed by the present inventors in Japanese Patent L-O-P Publns. Nos. 168708/1985, 120816/1986, 115912/1986 and 115916/1986, 252406/1987, 252407/1987, 271308/1986 and 272216/1986, while suitably selecting the conditions.

Furthermore, in the present invention, there may also be used as the substrate material a cycloolefin random copolymer composition comprising a cycloolefin random copolymer [A] prepared by copolymerizing ethylene with a cycloolefin represented by the following formula [I], [I-a] or [I-b] and having an intrinsic viscosity [η] of 0.05–10 dl/g measured in decalin at 135° C. and a softening temperature (TMA) of at least 70° C., and a cycloolefin random copolymer [B] prepared by copolymerizing ethylene with a cycloolefin represented by the formula [I], [I-a] or [I-b] and having an intrinsic viscosity [η] of 0.05–5 dl/g measured in decalin at 135° C. and a softening temperature (TMA) of less than 70° C.

Furthermore, the substrate of the magnetooptical recording media according to the invention may be made of polymers having recurring units of the general formula [III] resulting from ring opening of the cycloolefin monomers [I], or polymers having recurring units of the general formula [IV] resulting from hydrogenation of the units [III].

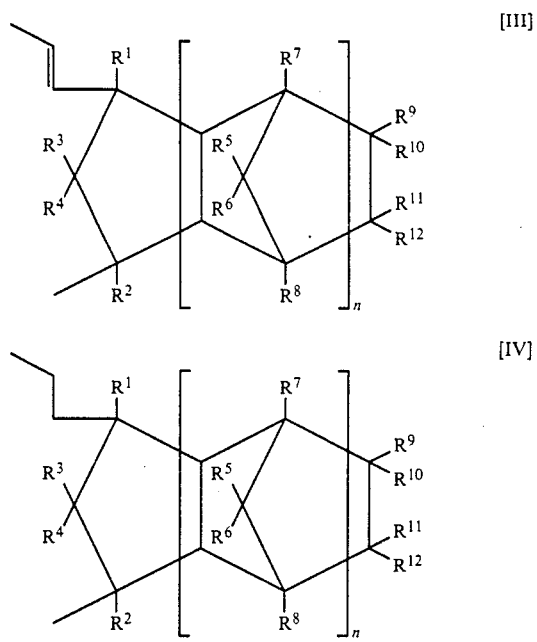

In the general formula [III] or [IV], n and $R^1$ to $R^{12}$ are as defined in the general formula [I].

A thickness of the substrate, though not particularly limited, is preferably 0.5–5 mm and especially 1–2 mm.

In the invention, materials for the recording layer 3 are not particularly limited to specific ones. However, when the substrate 3 used is a magnetooptical recording layer having a monoaxial anosotropy perpendicular to the layer surface, this recording layer 3 is preferably composed of at least one member selected from among (i) 3d transition metals and at least one element selected from among (iii) rare earth elements, or composed of at least one member selected from among (i) 3d transition metals, (ii) a corrosion-resistant metal, and at least one element selected from among (iii) rare earth elements.

The 3d transition metals used include Fe, Co, Ti, V, Cr, Mn, Ni, Cu and Zn. Of these metals, preferred is Fe or Co, or are both of them.

The corrosion-resistant metal (ii) is capable of improving oxidation resistance of this magnetooptical recording layer as the recording layer 3 by incorporation into this recording layer 3 of said corrosion-resistant metal. Such corrosion-resistant metal used includes Pt, Pd, Ti, Zr, Ta, Mo, Nb and Hf. Of these metals, preferred are Pt, Pd and Ti, and particularly Pt or Pd, or both of them.

The rate earth elements (iii) used include, for example, Gd, Tb, Dy, Ho, Er, Tm, Yb, Lu, La, Ce, Pr, Nd, Pm, Sm and Eu. Of these elements, preferred are Gd, Tb, Dy, Ho, Nd, Sm and Pr.

Such magnetooptical recording layer as mentioned above desirably contains the $3d$ transition metal (i) in an amount of 30–85 atom %, preferably 40–70 atom %, the corrosion-resistant metal (ii) in an amount of less than 30 atom %, preferably 5–25 atom %, and the rare earth element (iii) in an amount of 5–50 atom %, preferably 25–45 atom %.

When the recording layer 3 used is other than the magnetooptical recording layer, for example, said recording layer is a phase change type recording layer, this recording layer 3 is composed of such an alloy film, for example, as consisting essentially of Te or Se, and of Te-Ge-Sb alloy film, In-Sb-Te alloy film Te-Ge-Cr alloy film or Te-Ge-Zn alloy film. Further an organic dye film composed of polymethine compounds or cyanine compounds may also be used as the phase change type recording layer.

A thickness of the recording layer 3, though not particularly limited, is 50–5000 Å, preferably 100–2000 Å.

In the first information recording medium of the present invention, the metallic layer is formed from an aluminum alloy containing 0.1–9.5 atom %, preferably 1–5 atom % of titanium and 0.1–5 atom %, preferably 1–3 atom % of chromium based on all atoms constituting aluminum alloy layer.

In this aluminum alloy, the combined content of titanium and chromium is desirably not more than 10 atom %.

The metallic layer of the first information recording medium of the invention as illustrated above may contain small amounts of at least one of other element (metal) in addition to the above-mentioned aluminum, titanium and chromium. Such other element (metal) as mentioned above includes, for example, silicon (Si), tantalum (Ta), copper (Cu), tungsten (W), zirconium (Zr), manganese (Mn), vanadium (V) and niobium (Nb). The amount of the other element (metal) contained, if any, in the metallic layer is usually not more than 5 atom %, preferably not more than 2 atom %.

In the second information recording medium of the invention, the metallic layer is formed from an aluminum alloy containing 0.5–5 atom %, preferably 1–3 atom % of titanium and 0.5–5 atom %, preferably 1–3 atom % of niobium (Nb) based on all atoms constituting aluminum alloy layer.

In this aluminum alloy, the combined content of titanium and niobium is desirably 1–5.5 atom %, preferably 2–4 atom %.

The metallic layer of the second information recording medium as illustrated above may contain small amounts of at least one of other element (metal) in addition to the above-mentioned aluminum, titanium and niobium. Such other element (metal) as mentioned above includes, for example, silicon (Si), tantalum (Ta), copper (Cu), tungsten (W), zirconium (Zr), manganese (Mn), magnesium (Mg), vanadium (V) and chromium (Cr). The amount of the other element (metal) contained, if any, in the metallic layer is usually not more than 5 atom %, preferably not more than 2 atom %.

In the third information recording medium of the invention, the metallic layer is formed from an aluminum alloy containing 0.1–10 atom %, preferably 1–5 atom % of titanium, 0.1–10 atom %, preferably 1–5 atom % of magnesium based on all atoms constituting aluminum alloy layer.

In this aluminum alloy, the combined content of titanium and magnesium is desirably not more than 15 atom %, preferably 1–10 atom %.

In the fourth information recording medium of the invention, the metallic layer is formed from an aluminum alloy containing 0.1–10 atom %, preferably 1–5 atom % of titanium, and 0.1–10 atom %, preferably 1–5 atom % of magnesium and not more than 10 atom %, preferably 0.1–10 atom % more preferably 1–5 atom % of chromium based on all atoms constituting aluminum alloy layer.

In this aluminum alloy, the combined content of titanium, magnesium and chromium is desirably not more than 15 atom %, preferably 1–10 atom %.

The metallic layers of the third and fourth information recording media of the invention as illustrated above may contain small amounts of at least one other element (metal) in addition to the above-mentioned aluminum, titanium, and magnesium or aluminum, titanium, magnesium and chromium. Such other element (metal) as mentioned above includes, for example, silicon (Si), tantalum (Ta), copper (Cu), tungsten (W), zirconium (Zr), manganese (Mh), and vanadium (V). The amount of the other element (metal) contained, if any, in the metallic layer is usually not more than 5 atom %, preferably not more than 2 atom %.

Such metallic layers as mentioned above have a film thickness of 100–5000 Å, preferably 500–3000 Å and especially 700–2000 Å.

The metallic layers used in the present invention fulfill their function as good heat conductive layers, and in the presence of these metallic layers, the center portion of pits formed in the recording layers may be prevented from being excessively heated to high temperature by the action of the recording laser beam applied thereto. As the result, it is considered that the dependence of the information recording media of the invention on linear velocity is made small.

The metallic layers of the invention which are also excellent in corrosion resistance have such a characteristic feature that the dependence of the information recording media on linear velocity is small even after being used for a long period of time, and that said metallic layers are excellent in performance of protecting the recording layers.

The structure of the information recording media of the invention shown in FIG. 1 is given by way of illustration but not of limitation. For instance, they may be prepared by providing a protecting film (enhancing film) 5 on the aforementioned substrate 5 and then providing further the recording layer 3 and the metallic layer 4 in that order. The protective film (enhancing film) 5 is formed desirably from $Si_3N_4$, $SiN_x$ ($0<x<4/3$), AlN, ZnSe, ZnS, Si or CdS, though not limited thereto. A thickness of this protective film is 100–2000 Å, preferably about 300–1500 Å. Of these materials used for forming the protective film, particularly preferred are $Si_3N_4$ and $SiN_x$ ($0<x<4/3$) from a viewpoint of crack resistance.

The function of the protective film is to protect the recording layer and, at the same time, it enhances the information recording medium in sensitivity and functions as an enhancing film. Such a protective layer desirably has a refractive index larger than that of the substrate.

The information recording media of the present invention may be prepared by forming on the substrate the recording layer and the metallic layer and, if necessary, the protective layer using such film-forming methods, for example, vacuum deposition, sputtering, electron beam deposition or the like.

EFFECT OF THE INVENTION

The information recording media of the present invention comprising the metallic layer composed of an aluminum alloy containing (i) titanium and (ii) at least one metal selected from among chromium, niobium and magnesium as illustrated above are excellent in corrosion resistance, small in dependence of the recording power on linear velocity and excellent in performance of protecting the recording layer.

The present invention is illustrated below with reference to examples, but it should be construed that the invention is in no way limited to those examples.

The term "optimum recording power" used in the following Examples designates a recording power with which writing signals at a frequency of 1MHz and a duty factor of 50% are recorded and which makes minimum the secondary harmonics of signals reproduced from the recorded signals. Recording media show a lower degree of dependence on the linear velocity when the information recording media show smaller difference of the optimum recording powers determined at different linear velocities.

EXAMPLE 1

Hereinafter, corrosion resistance of the metallic layer was examined first by the following procedure.

On a glass substrate, was deposited a metallic layer of 1000 Å in thickness composed of an aluminum-titanium-chromium alloy by the sputtering process using a composite target of aluminum-titanium-chromium. The titanium and chromium contents in the aluminum alloy constituting the metallic layer thus obtained were each 2 atom %.

This metallic layer was immersed for 4 hours at 60° C. in an aqueous solution containing 10% by weight of sodium chloride, whereby the corrosion resistance of the metallic layer was evaluated by measuring a change in reflectance of said metallic layer and surface profile of said metallic layer after the 4 hour immersion thereof.

No change in reflectance of the metallic layer before and after the immersion in the aqueous sodium chloride solution of said metallic layer was observed.

The number of pinholes observed in the metallic layer after the immersion thereof was not more than 50 pieces (was 40 pieces) per unit area of the metallic layer (5 cm×5 cm).

EXAMPLE 2

On a disk substrate composed of an amorphous copolymer of ethylene with 1,4,5,8-dimethano-1,2,3,4,4a,5,8,8a-octahydronaphthalene (structure formula:

abbreviated to DMON hereinafter), the amorphous copolymer having 59 mol % of an ethylene unit content determined by NMR analysis, an intrinsic viscosity [$\eta$] of 0.42 dl/g measured in decalin at 135° C. and a softening temperature (TMA) of 154° C., were deposited successively a protective film composed of $Si_3N_4$ to a thickness of 1000 Å and a recording layer composed of $Pt_{10}Tb_{29}Fe_{55}Co_6$ (atom %) to a thickness of 500 Å by the sputtering process, and thereon was deposited a metallic layer composed of an Al-Cr-Ti alloy (700 Å in film thickness) by the sputtering process using a composite target of Al-Cr-Ti. In the aluminum constituting the metallic layer thus obtained, the Cr content was 2 atom % and the Ti content was 2 atom %.

The information recording medium thus obtained was held for about 720 hours under the circumstances of 80° C. and a relative humidity of 85%, whereby corrosion resistance of the metallic layer was evaluated by measuring a change in reflectance of said information recording medium.

No change in reflectance of the information recording medium was observed before and after holding the information recording medium under the circumstances of 80° C. and a relative humidity of 85%.

EXAMPLE 3

On a disk substrate composed of an amorphous copolymer of ethylene with 1,4,5,8-dimethano-1,2,3,4,4a,5,8,8a-octahydronaphthalene (structure formula:

abbreviated to DMON hereinafter), the amorphous copolymer having 59 mol % of an ethylene unit content determined by NMR analysis, an intrinsic viscosity [$\eta$] of 0.42 dl/g measured in decalin at 135° C. and a softening temperature (TMA) of 154° C., were deposited successively a protective film composed of $Si_3N_4$ to a thickness of 1100 Å and a recording layer composed of $Pt_{10}Tb_{29}Fe_{55}Co_6$ (atom %) to a thickness of 260 Å by the sputtering process, and thereon was deposited a metallic layer composed of an Al-Cr-Ti alloy (500 Å in film thickness) by the sputtering process using a composite target of Al-Cr-Ti. In the aluminum constituting the metallic layer thus obtained, the Cr content was 2 atom % and the Ti content was 2 atom %.

The information recording medium thus obtained was held for about 720 hours under the circumstances of 80° C. and a relative humidity of 85%, whereby corrosion resistance of the metallic layer was evaluated by measuring a change in reflectance of said information recording medium.

No change in reflectance of the information recording medium was observed before and after holding the information recording medium under the circumstances of 80° C. and a relative humidity of 85%.

The optimum recording power of this information recording power at a linear velocity of 5.7 m/sec was 3.5 mW, and the optimum recording power at a linear velocity of 11.3 m/sec was 5.1 mW.

COMPARATIVE EXAMPLE 1

On a glass substrate, was formed a metallic layer composed of an aluminum alloy to (1000 Å in film thickness) by the sputtering process using a Composite target of aluminum-chromium.

The chromium content of the metallic layer thus formed was 2 atom %.

This metallic layer was immersed for 4 hours at 60° C. in an aqueous solution containing 10% by weight of sodium chloride.

After the 4-hour immersion of the metallic layer, changes in reflectance and surface profile of said metallic layer were measured.

The reflectance of the metallic layer thus immersed decreased by about 2%.

The number of pinholes observed on the metallic layer was about 70 pieces per unit area (5 cm × 5 cm).

COMPARATIVE EXAMPLE 2

A metallic layer containing 4 atom % of chromium was obtained in the same manner as in Comparative Example 1 but using a composite target of an aluminum-chromium alloy different in composition from the composite target used in Comparative Example 1.

This metallic layer was immersed in the same way as in Comparative Example 1 in the aqueous sodium chloride solution, whereby changes in reflectance and surface profile of the metallic layer thus immersed were measured.

No change in the reflectance of the metallic layer before and after the immersion in the aqueous sodium chloride solution of said metallic layer was observed, and the number of pinholes observed on the metallic layer after the immersion thereof was about 70 pieces per unit area (5 cm × 5 cm).

COMPARATIVE EXAMPLE 3

A metallic layer was obtained in the same way as in Comparative Example 1 but using a composite target of aluminum titanium in place of the composite target of aluminum-chromium.

The titanium content of the metallic layer thus obtained was 2 atom %.

This metallic layer was immersed in the same way as in Comparative Example 1 in the aqueous sodium chloride solution, whereby changes in reflectance and surface profile of the metallic layer thus immersed were measured.

The reflectance of the metallic layer thus immersed decreased by about 8%.

The number of pinholes observed on the metallic layer was 51 pieces per unit area (5 cm × 5 cm).

COMPARATIVE EXAMPLE 4

A metallic layer containing 4 atom % of titanium was obtained in the same manner as in Comparative Example 3 but using a composite target composed of an aluminum-titanium alloy different in composition from the composite target used in Comparative Example 4.

This metallic layer was immersed in the same way as in Comparative Example 1 in the aqueous sodium chloride solution, whereby changes in reflectance and surface profile of the metallic layer after the immersion thereof were measured.

The reflectance of the metallic layer thus immersed decreased by about 2%.

More than 115 pieces of pinholes were found on the surface of the metallic layer thus immersed.

EXAMPLE 4

On a glass substrate, was formed a metallic layer composed of an aluminum-titanium-niobium alloy (1100 Å in film thickness) by the sputtering process using a composite target of aluminum (Al)-titanium (Ti)-niobium (Nb). In this aluminum alloy, the content of Ti was 1.5 atom %, and that of Nb was 1.5 atom %.

This metallic layer was immersed for 4 hours at 60° C. in a saline solution containing 10% by weight of NaCl, whereby corrosion resistance of the metallic layer was evaluated by measuring changes in reflectance and surface profile of said metallic layer after the 4-hour immersion thereof. As the result, no change in reflectance of the metallic layer before and after the immersion thereof.

The number of pinholes observed on the surface of the metallic layer after the immersion thereof was not more than 40 pieces (38 pieces) per unit surface area (5 cm × 5 cm).

EXAMPLE 5

On a substrate used in Example 2, were deposited successively by the sputtering process a protective film (1000 Å in film thickness) composed of $Si_3N_4$ and a recording layer (500 Å in film thickness) composed of $Pt_{10}Tb_{29}Fe_{55}Co_6$, and was deposited thereon a metallic layer (700 Å in film thickness) composed of an Al-Ti-Nb alloy by the sputtering process using a composite target of Al-Ti-Nb. In the Al alloy (layer) constituting the metallic layer thus obtained, the Ti content was 2 atom % and the Nb content was 2 atom %.

The information recording medium thus obtained was held for about 720 hours under the circumstances of 80° C. and a relative humidity of 85%, whereby corrosion resistance of the metallic layer was evaluated by measuring a change in reflectance of said information recording medium.

No change in the reflectance of the information recording medium was observed before and after holding said metallic layer under the circumstance of 80° C. and a relative humidity of 80%.

EXAMPLE 6

On a substrate used in Example 2, were deposited successively by the sputtering process a protective film (1100 Å in film thickness) composed of $Si_3N_4$ and a recording layer (260 Å in film thickness) composed of $Pt_{10}Tb_{29}Fe_{55}Co_6$, and was deposited thereon a metallic layer (500 Å in film thickness) composed of an Al-Ti-Nb alloy by the sputtering process using a composite target of Al-Ti-Nb. In the Al alloy (layer) constituting the metallic layer thus obtained, the Ti content was 2 atom % and the Nb content was 2 atom %.

The information recording medium thus obtained was held for about 720 hours under the circumstances of 80° C. and a relative humidity of 85%, whereby corrosion resistance of the metallic layer was evaluated by measuring a change in reflectance of said information recording medium.

No change in the reflectance of the information recording medium was observed before and after holding said metallic layer under the circumstance of 80° C. and a relative humidity of 85%.

The optimum recording power of this information recording medium at a linear velocity of 5.7 m/sec was 3.6 mW, and the optimum recording power at a linear velocity of 11.3 m/sec was 5.5 mW.

EXAMPLE 7

On a glass substrate, a metallic layer (1000 Å in film thickness) composed of an aluminum-titanium-magnesium alloy was formed by the sputtering process using a composite target of aluminum (Al)-titanium (Ti)-magnesium (Mg). The content of Ti was 2.0 atom % and that of Mg was 4.0 atom %.

This metallic layer was immersed for 4 hours at 60° C. in a saline solution containing 10% by weight of NaCl, whereby corrosion resistance of the metallic layer was evaluated by measuring changes in reflectance and surface profile of said metallic layer. As the result, no change in reflectance was observed before and after the immersion thereof.

The number of pinholes observed on the surface of the metallic layer thus immersed was not more than 30 pieces (27 pieces) per unit area of 5 cm×5 cm.

COMPARATIVE EXAMPLE 5

On a glass substrate, was formed a metallic layer (1000 Å in thickness) composed of an aluminum-magnesium alloy by the sputtering process using a composite target of aluminum-magnesium.

The content of magnesium in the metallic layer thus obtained was 5 atom %.

This metallic layer was immersed for 4 hours at 60° C. in an aqueous solution containing 10% by weight of sodium chloride.

After the 4-hour immersion, change in reflectance and surface profile of the metallic layer were measured.

The reflectance of the metallic layer thus immersed decreased by about 2%.

The number of pinholes observed on the surface of the metallic layer thus immersed was about 70 pieces per unit area (5 cm×5 cm).

EXAMPLE 8

On a disk substrate composed of an amorphous copolymer of ethylene with 1,4,5,8-dimethano-1,2,3,4,4a,5,8,8a-octahydronaphthalene (structure formula:

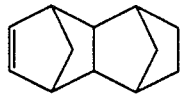

abbreviated to DMON hereinafter), the amorphous copolymer having 59 mol % of an ethylene unit content determined by NMR analysis, an intrinsic viscosity $[\eta]$ of 0.42 dl/g measured in decalin at 135° C. and a softening temperature (TMA) of 154° C., were deposited successively a protective film composed of $Si_3N_4$ to a thickness of 1100 Å and a recording layer composed of $Pt_{10}Tb_{29}Fe_{55}Co_6$ (atom %) to a thickness of 260 Å by the sputtering process, and thereon was deposited a metallic layer composed of an Al-Mg-Ti alloy (800 Å in film thickness) by the sputtering process using a composite target of Al-Mg-Ti. In the aluminum constituting the metallic layer thus obtained, the Mg content was 4 atom % and the Ti content was 2 atom %.

The optimum recording power of this information recording power at a linear velocity of 5.7 m/sec was 4.5 mW, and the optimum recording power at a linear velocity of 11.3 m/sec was 6.0 mW.

EXAMPLE 9

On a disk substrate composed of an amorphous copolymer of ethylene with 1,4,5,8-dimethano-1,2,3,4,4a,5,8,8a-octahydronaphthalene (structure formula:

abbreviated to DMON hereinafter), the amorphous copolymer having 59 mol % of an ethylene unit content determined by NMR analysis, an intrinsic viscosity $[\eta]$ of 0.42 dl/g measured in decalin at 135° C. and a softening temperature (TMA) of 154° C., were deposited successively a protective film composed of $Si_3N_4$ to a thickness of 1100 Å and a recording layer composed of $Pt_{10}Tb_{29}Fe_{55}Co_6$ (atom %) to a thickness of 260 Å by the sputtering process, and thereon was deposited a metallic layer composed of an Al-Mg-Ti-Cr alloy (500 Å in film thickness) by the sputtering process using a composite target of Al-Mg-Ti-Cr. In the aluminum constituting the metallic layer thus obtained, the Mg content was 4 atom %, the Cr content was 2 atom % and the Ti content was 1 atom %.

The optimum recording power of this information recording power at a linear velocity of 5.7 m/sec was 4.0 mW, and the optimum recording power at a linear velocity of 11.3 m/sec was 5.7 mW.

What is claimed is:

1. In an information recording medium having a substrate and thereon a recording layer and a metallic layer, the improvement which resides in that the metallic layer is composed of an aluminum alloy containing 0.1-9.5 atom % of titanium and 0.1-5 atom % of chromium based on all atoms constituting the aluminum alloy, the combined content of said titanium and chromium being not more than 10 atom %.

2. In an information recording medium having a substrate and thereon a recording layer and a metallic layer, the improvement which resides in that the metallic layer is composed of an aluminum alloy containing 0.5-5 atom % of titanium and 0.5-5 atom % of niobium based on all atoms constituting the aluminum alloy, the combined content of said titanium and niobium being 1-5.5 atom %.

3. In an information recording medium having a substrate and thereon a recording layer and a metallic layer, the improvement which resides in that the metallic layer is composed of an aluminum alloy containing 0.1-10 atom % of titanium and 0.1-10 atom % of magnesium based on all atoms constituting the aluminum alloy, the combined content of said titanium and magnesium being not more than 15 atom %.

4. In an information recording medium having a substrate and thereon a recording layer and a metallic layer, the improvement which resides in that the metallic layer is composed of an aluminum alloy containing 0.1-10 atom % of titanium, 0.1-10 atom % of magnesium and not more than 10 atom % of chromium based on all atoms constituting the aluminum alloy, the combined content of said titanium, magnesium and chromium being not more than 15 atom %.

5. The information recording medium as claimed in any of claims 1-4 wherein the recording layer is a magnetooptical recording layer.

6. The information recording medium as claimed in any of claims 1-4 wherein a film thickness of the metallic layer is 100-5000 Å.

* * * * *